United States Patent Office.

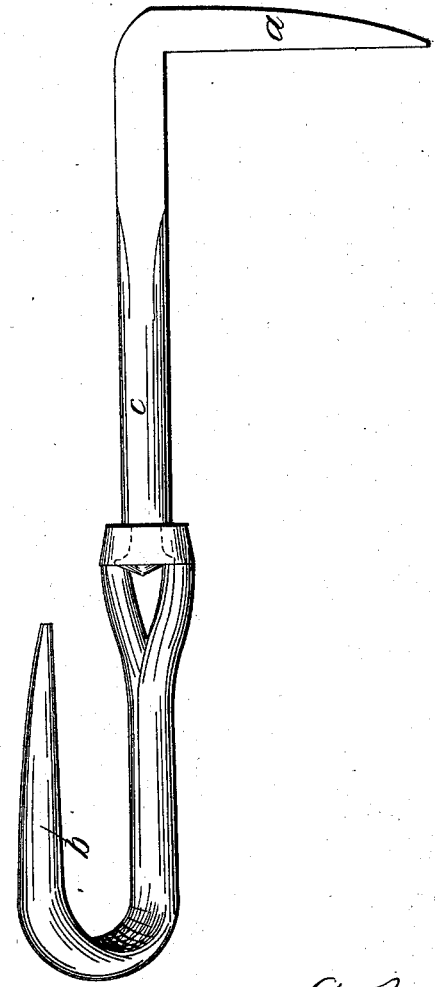

ASA M. BEARD, OF HILLSBORO, NEW HAMPSHIRE.

Letters Patent No. 62,309, dated February 26, 1867.

IMPROVEMENT IN SAW-MILL DOGS.

*The Schedule referred to in these Letters Patent and making part of the same.*

TO ALL WHOM IT MAY CONCERN:

Be it known that I, ASA M. BEARD, of Hillsboro, in the county of Hillsboro, and State of New Hampshire, have invented an improved Saw-Mill Dog; and I do hereby declare that the following, taken in connection with the drawings which accompany and form part of this specification, is a description of my invention sufficient to enable those skilled in the art to practise it.

In sawing logs into lumber the practice is to fasten the log in position upon the carriage by means of a metal dog or dog-hook, which has a spur at one end to be driven into the log, and is fastened by a hook, at its other end, to an eye or staple upon the carriage or the knees connected with said carriage; but, as the spur upon the dog has to be driven into the log at various angles, and as the hook upon the other end has a rigid connection to the spur, admitting of no relative movement, it is often impossible to make proper connection between the spur driven into the log and the eye into which the dog is hooked, and an undue strain is brought upon and often breaks the shank. To remedy this difficulty is the object of my invention, and I accomplish the desired result by making one part of the shank to swivel upon, or with respect to the other, and it is this construction which constitutes my invention.

The drawing represents a saw-mill dog embodying my improvement.

$a$ denotes the spur to be driven into the log; $b$, the hook by which the dog is connected to the eye-bolt or staple on the carriage, this spur and hook having, as a spur and a hook, the common construction. The shank $c$, however, by which the two are connected, is divided into two parts; the spur-shank extending through a head formed on the hook-shank, or *vice versa*, in such manner that while they are strongly connected together to form one instrument, one part may turn relatively to the other, as will be readily understood. Now, it will be obvious that so long as the spur is driven into the log in a vertical plane it makes no difference, with reference to connecting the hook to its eye, what may be the inclination of the spur in this plane, as the hook may be turned to accommodate itself to the angle of the spur, or *vice versa*, and that when any twisting strain comes upon the dog one part readily swivels with respect to the other and thus prevents the dog from breaking.

I claim the improved saw-mill dog, consisting of the shank $c$, provided with the spur $a$, attached to the hook $b$ by a swivel joint, substantially as herein shown and described.

ASA M. BEARD.

Witnesses:
 ONSLOW GILMORE,
 HANNAH I. DICKEY.